July 7, 1953
H. DUKE ET AL
2,644,919
MAGNETIC AXIS AND POLARITY TESTING DEVICE
Filed Nov. 25, 1950
3 Sheets-Sheet 1
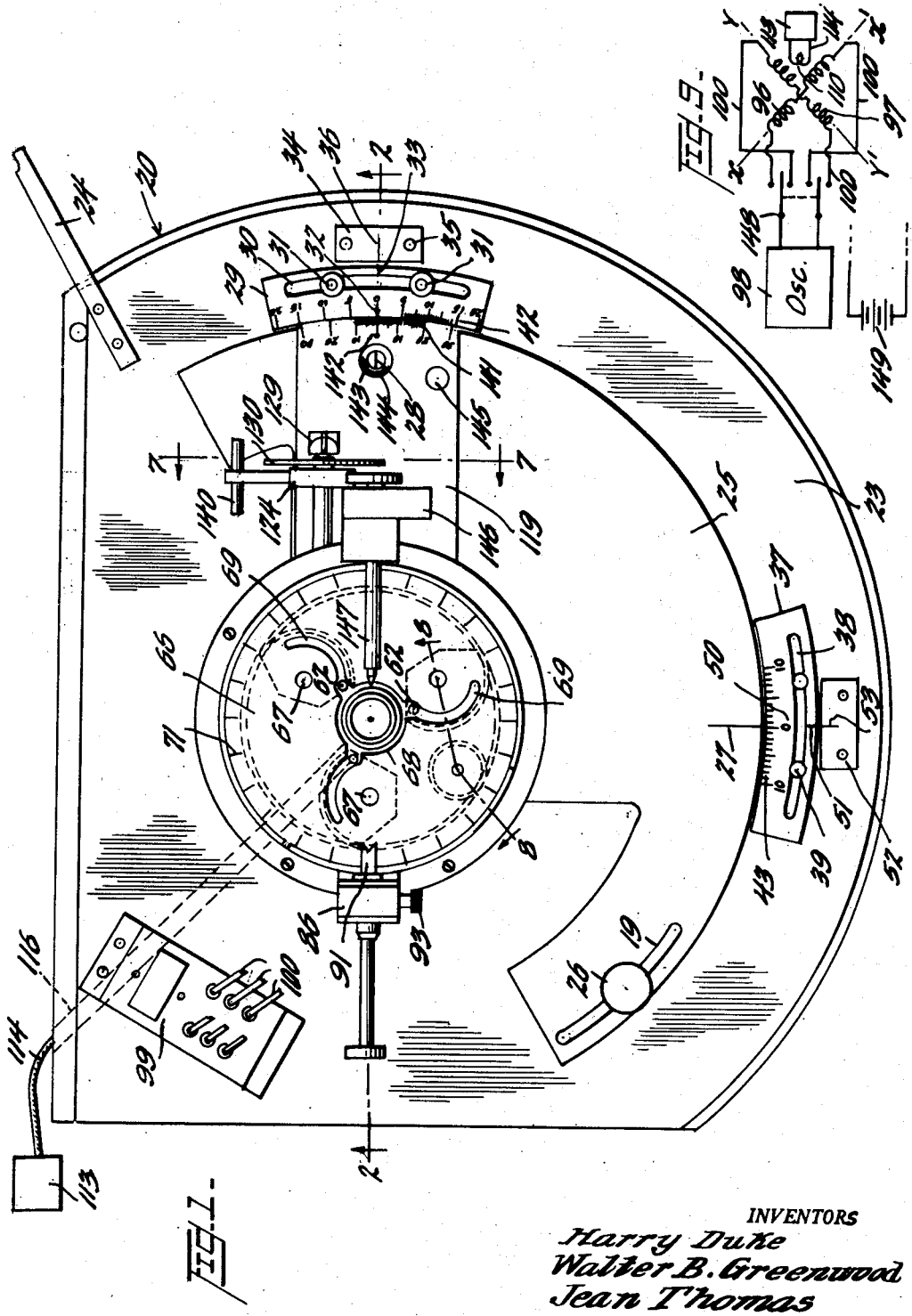
INVENTORS
*Harry Duke*
*Walter B. Greenwood*
*Jean Thomas*
*C. B. Hamilton*. ATTORNEY July 7, 1953    H. DUKE ET AL    2,644,919
MAGNETIC AXIS AND POLARITY TESTING DEVICE
Filed Nov. 25, 1950    3 Sheets-Sheet 2
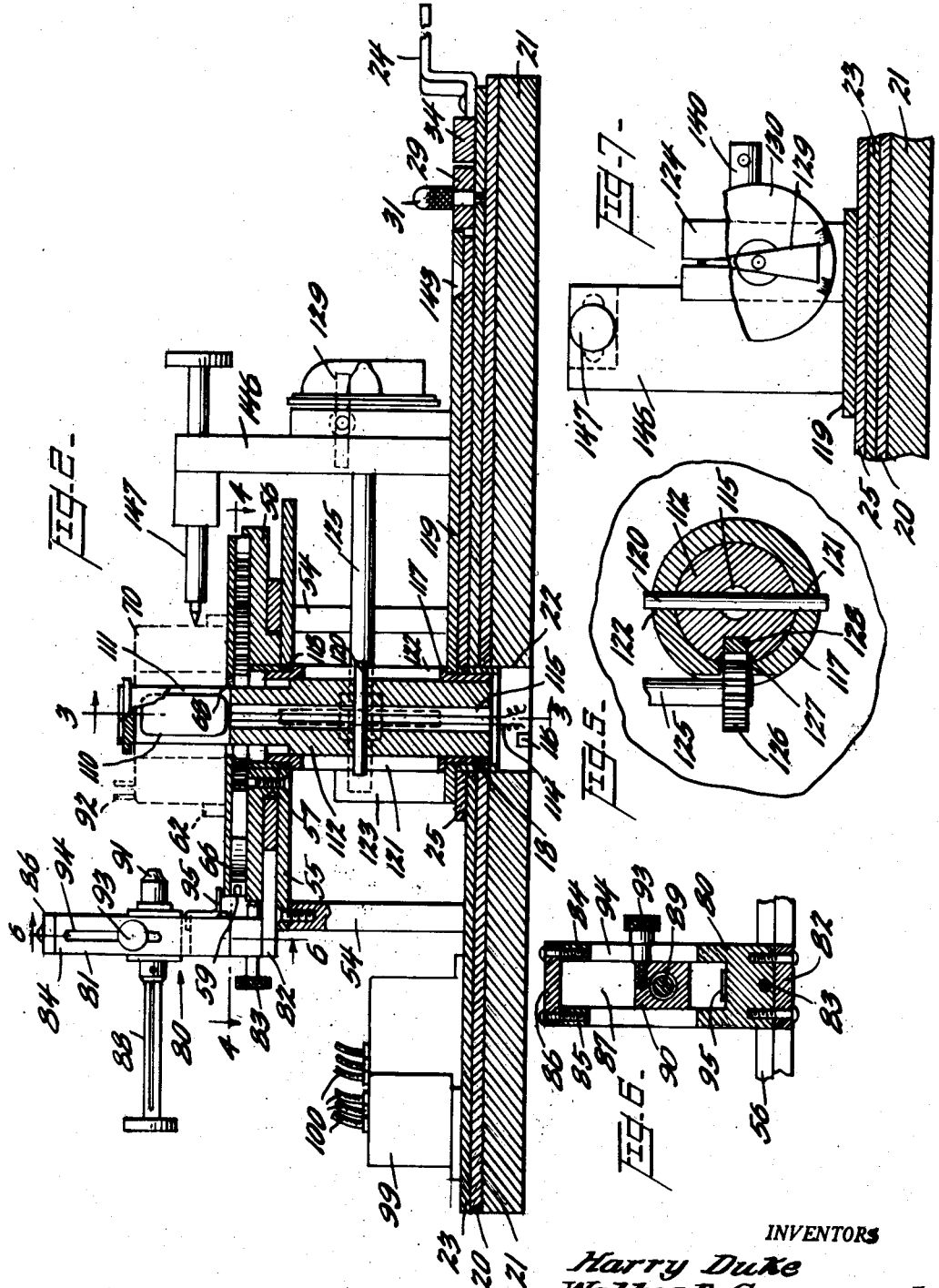
INVENTORS
Harry Duke
Walter B. Greenwood
Jean Thomas
By C. B. Hamilton
ATTORNEY July 7, 1953        H. DUKE ET AL        2,644,919
MAGNETIC AXIS AND POLARITY TESTING DEVICE
Filed Nov. 25, 1950        3 Sheets-Sheet 3
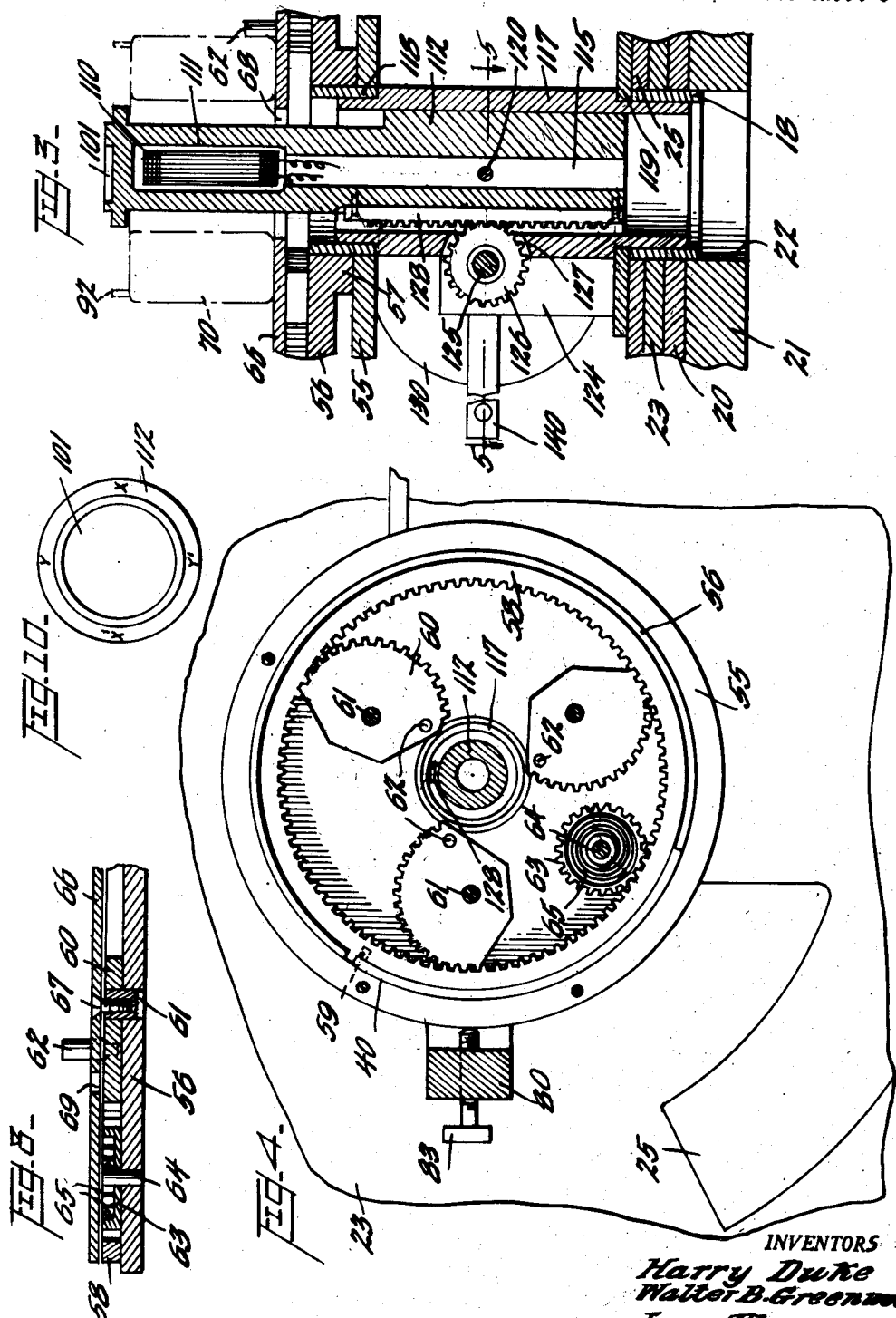
INVENTORS
Harry Duke
Walter B. Greenwood
Jean Thomas
By
C. B. Hamilton ATTORNEY Patented July 7, 1953

2,644,919

UNITED STATES PATENT OFFICE 2,644,919

MAGNETIC AXIS AND POLARITY TESTING DEVICE

Harry Duke, Walter Baker Greenwood, and Jean Thomas, Winston-Salem, N. C., assignors to Western Electric Company, Incorporated, New York, N. Y., a corporation of New York Application November 25, 1950, Serial No. 197,604

12 Claims. (Cl. 324—34)

This invention relates to a device for determining and indicating the relative positions of magnetic axes and polarity of a multiple coil inductor and more particularly to a device for indicating the angular separation between the magnetic axes and magnetic polarity of different coils enclosed within a single inductor unit.

The recent increase in the use of cathode ray oscilloscopes and related equipment as indicating devices for the graphic display of certain electromagnetically propagated intelligence has produced a need for accurately and quickly determining the relative positions of the axes of a plurality of electromagnetic fields, which fields are produced by a plurality of electrically separate coils enclosed within a single inductor unit or a plurality of separate concentric inductor units. One of the more prevalent problems is to determine whether or not the zero or maximum field strength axes of electromagnetic fields produced by two different coils are perpendicular to each other or within a certain tolerance range greater or less than perpendicularity. Another problem is to determine the relative positions of these magnetic axes with respect to connecting pins or plugs on the unit, which are used to interconnect the coils thereof with the operating system in which the inductor is to be used. It is important that the magnetic axes be correctly positioned in relation to these pins since the pins are often used as locating elements to place the electromagnetic fields of the inductor in a predetermined position within the operating system. It is also necessary to accurately determine the polarity of the connections to the coils in order to determine the vectorial direction of the electromagnetic fields produced by the coils.

Accordingly, it is an object of this invention to provide an easily operated inductor testing device for indicating quickly the relative positions of a plurality of magnetic axes produced by a plurality of coils enclosed within a single inductor unit.

Another object of this invention is to provide an apparatus for determining the positions of a plurality of magnetic axes produced by a multiple coil inductor with respect to electrical connecting pins or plugs used to interconnect the inductor with the operating system in which the inductor is to be used.

Another object of this invention is to provide a means for determining the polarity of an electromagnetic field produced by a coil enclosed within a multiple coil inductor unit.

In accordance with these and other objects, an embodiment of the invention comprises a multiple coil inductor holding means which is secured to a base so that a vertically movable electromagnetic pick-up coil can be moved into the effective field of the inductor. The pick-up coil is carried by an indicating arm which is rotatably mounted on the base so as to cooperate with a scale member mounted on the base to give an indication of the angular position of the pick-up coil within the inductor. A test oscillator is sequentially connected to the plurality of coils comprising the inductor to produce a series of electromagnetic fields each having an axis of minimum and an axis of maximum electromagnetic field strength. By moving the indicating arm and pick-up coil secured thereto from the point of minimum or maximum field strength produced by the energization of a first coil to the point of minimum or maximum field strength produced by the energization of a second coil, an operator can observe the angular displacement between the two magnetic axes on the scale member secured to the base. An adjustable inductor connecting pin locating means positioned adjacent the holding means and cooperating with a scale secured to the holding means permits the operator to compare the angular deflection measurements procured from the base scale with the position of the connecting pins or plugs on the inductor unit. A scribe is secured to the indicating arm adjacent the inductor holding means to provide means for marking the cover of the inductor unit to indicate the position of the magnetic axis of any or each of the plurality of coils within the inductor unit.

Many other objects and advantages of the invention will be apparent from the description in conjunction with the drawings wherein Fig. 1 is a plan view of the magnetic axis determining and indicating apparatus embodying the invention;

Fig. 2 is a cross-sectional view taken along line 2—2 in Fig. 1 showing an inductor unit in testing position on the axis determining and indicating apparatus;

Fig. 3 is an enlarged fragmentary sectional view taken along line 3—3 in Fig. 2 disclosing an electromagnetic pick-up coil and means for vertically adjusting the position of the pick-up coil relative to the inductor unit under test;

Fig. 4 is an enlarged fragmentary sectional view taken along line 4—4 in Fig. 2 showing the holding means for the inductor unit;

Fig. 5 is an enlarged fragmentary top sectional view taken along line 5—5 in Fig. 3 disclosing the pick-up coil vertical adjusting means;

Fig. 6 is an enlarged fragmentary sectional view taken along line 6—6 in Fig. 2 showing a means for securing an inductor connecting pin locating device in a predetermined azimuth position;

Fig. 7 is a fragmentary elevational view taken along line 7—7 in Fig. 1 of a means for locking the pick-up coil adjusting means in a predetermined vertical position;

Fig. 8 is an enlarged sectional view taken along line 8—8 in Fig. 1 showing the details of the inductor unit holding means;

Fig. 9 is a schematic circuit diagram of the testing circuit used with the magnetic axes indicating apparatus shown in Fig. 1; and Fig. 10 is a top view of a means for securing a magnetic compass in position adjacent the electromagnetic pick-up coil.

Referring now to the drawings, wherein like reference numerals designate the same elements throughout the several views, and more particularly to Figs. 1 and 2 of the drawings, a base plate 20 is secured to a wooden base 21 (Fig. 2) so that an opening in the plate 20 is aligned with an opening 22 in the wooden base 21. An adjustable base plate 23, having a handle 24 secured to the plate 23, is rotatably positioned on the fixed base plate 20 so that an opening therein is in alignment with the opening 22.

A quadrant plate 25 rests upon an upper surface of the adjustable base plate 23 and is secured to a bushing 18 which extends through the aligned openings in plates 20 and 23 into opening 22. The bushing 18 is rotatably mounted in the opening 22 so that the quadrant plate 25 is movable over the upper surface of the adjustable base plate 23. A knurled thumbscrew 26 (Fig. 1) extends through a slot 19 in plate 25 to engage a threaded aperture in the adjustable base plate 23 so that the thumbscrew 26 may be tightened to secure plate 25 in a predetermined position on plate 23. The quadrant plate 25 is also provided at its outer edge with a pair of etched index marks 27 and 28 which are angularly displaced from each other by 90° plus or minus 0° 1'.

An adjustable scale plate 29 having an arcuate slot 30 therein is secured in a desired position on the base plate 23 adjacent the outer periphery of quadrant plate 25 by a pair of thumbscrews 31 which extend through the slot 30 (Fig. 1) to engage threaded apertures in the base plate 23 (Fig. 2). A scale portion 42 of the plate 29 (Fig. 1) adjacent the periphery of the quadrant plate 25 is calibrated in degrees of angular deflection from a mid-zero degree index mark 32. A second zero degree index mark 33 is etched on the upper and outer surface of the plate 29 in alignment with the zero index mark 32. A block 34 is secured to the base plate 23 by a pair of screws 35 adjacent the outer edge of plate 29 so that an index mark 36 etched on block 34 is in alignment with both of the index marks 32 and 33. The index mark 36 is designated X.

Another adjustable scale plate 37 (Fig. 1) having an arcuate slot 38 therein is secured in a predetermined position on the base plate 23 by a pair of thumbscrews 39 which extend through the slot 38 to engage threaded apertures in the base plate 23. A scale portion 43 of the plate 37 adjacent the outer edge of the quadrant plate 25 is calibrated the same as plate 29 (Fig. 1) in degrees of angular deflection from a mid-zero degree index mark 50. An index mark 51 is etched on the upper surface of the plate 37 in alignment with the index mark 50 but positioned on the outer or lowermost edge of plate 37 as viewed in Fig. 1. A block 52 is secured to the base plate 23 adjacent the outer edge of plate 37 so that an index mark 53 etched on block 52 is displaced 90° clockwise from index mark 36 on block 34. Therefore, when index mark 28 is moved into alignment with the normally aligned marks 32, 33 and 36, mark 27 is in alignment with the normally aligned marks 50, 51 and 53.

A plurality of legs 54 (Fig. 2) which are secured to the base plate 23 support an apertured plate 55 a predetermined distance above the upper surface of plate 23. An apertured gear housing 56 having a depending flange 57 is secured to the upper surface of the plate 55 with the apertures of the plate 55 and gear housing 56 in alignment. An internal ring gear 58 (Figs. 2 and 4) is rotatably mounted on an upper surface of the gear housing 56. A hole 59 is provided in the outer edge of the ring gear 58 so that a tool may be manually inserted therein through a keyway 40 in the gear housing 56 to rotate the ring gear 58 within the housing 56.

Three planetary gears 60 (Fig. 4) are rotatably mounted on three shafts 61 which are secured to the gear housing 56 so that the teeth of the gears 60 mesh with the teeth of the ring gear 58. A clutch pin 62 is secured to each of the gears 60. A spur gear 63 having a counterbored upper surface is rotatably mounted on a shaft 64 secured to the gear housing 56 (Fig. 8) so that the teeth of the gear 63 mesh with the teeth of the ring gear 58. One end of a flat spiral spring 65 is secured to the gear 63 and the other end is secured to the shaft 64 so that the convolutions of the spring are positioned within the counterbored depression in the upper surface of the gear 63. A gear housing cover plate 66 is secured to an upper extremity of the shafts 61 (Fig. 8) by a plurality of screws 67. The cover plate 66 (Figs. 1 and 2) is provided with a round central opening 68 and three arcuate slots 69 through which the upstanding clutch pins 62 extend. A circular scale portion 71 on the outer periphery of the cover plate 66 is calibrated from 0° to 360° of angular deflection with the zero degree (0°) mark thereof in alignment with the index mark 36 on block 34.

When ring gear 58 is manually rotated in a counterclockwise direction, the three gears 60 are also rotated in a counterclockwise direction to move the projecting gripping pins 62 away from each other and outwardly from the central opening 68. The counterclockwise rotation of ring gear 58 also rotates gear 63 in a counterclockwise direction to wind up spiral spring 65. After an inductor 70 (Fig. 2) to be tested is placed on the plate 66 with the inner cylindrical cavity of the inductor 70 aligned with the opening 68, the operator releases the ring gear 58 so that the resilient action of the spring 65 rotates gear 63 in a clockwise direction to move both ring gear 58 and gears 60 in a clockwise direction until the pins 62 engage the outer surface of the inductor 70 to secure it in adjusted position on the plate 66. The continuing resilient action of spring 65, which is not completely unwound, maintains the pins 62 in gripping engagement with the outer surface of inductor 70 and thereby secures it in a central position on plate 66.

A right angle bracket 80 (Fig. 2) having a bifurcated upright portion 81 is rotatably mounted on the flanged portion 57 of the gear housing 56 by a lower annular horizontal portion 82 of the bracket 80. A knurled thumbscrew 83 passing through a lower extremity of the upright portion 81 engages the outer edge of the gear housing 56 to clamp the bracket 80 in a predetermined angular position adjacent the plate 66. Two upwardly extending arms 84 and 85 (Fig. 6) of the bracket 80 are joined together by a cross bar 86 at the upper extremity thereof to provide a vertical channel 87 in which an inductor connecting pin locating arm 88 is adjustably secured. The locating arm 88 is slidably journalled in a bushing block 90 so that a bifurcated tip 91 thereof may be moved into engagement with a connecting pin 92 on the inductor unit 70 (Fig. 2). The bushing 90 is vertically adjustable in the channel 87 (Fig. 6) to provide for inductor units 70 of varying heights and is secured in a predetermined position by a knurled thumbscrew 93 which extends through a slot 94 in the arm 84 to engage a threaded aperture in the bushing block 90. A pointer 95 is secured to the bracket 80 so as to cooperate with the scale portion 71 on the cover plate 66.

A constant frequency voltage is applied to any one of a plurality of coils 96 and 97 (Fig. 9) of the inductor unit 70 (Fig. 2) from an adjustable frequency oscillator 98 (Fig. 9) by means of connection box 99 (Figs. 1 and 2) and a plurality of conductors 100. The energization of one of the coils 96 or 97 (Fig. 9) produces an electromagnetic field which is detected by an electromagnetic pick-up coil 110 (Fig. 3).

The electromagnetic pick-up coil 110 is secured within a slot 111 (Figs. 2 and 3) in a cylinder 112 which extends upwardly through opening 68 (Figs. 1 and 3) into the inner cylindrical cavity of the inductor unit 70 (Figs. 2 and 3). The coil 110 is connected to an electromagnetic field strength indicator 113 such as a voltmeter (Figs. 1 and 9) by a pair of conductors 114 which extend from the coil 110 through an aperture 115 in the cylinder 112 and a slot 116 (Fig. 2) in the lower surface of the wooden base 21 to the indicating device 113. A depression 101 (Fig. 3) is provided in the upper extremity of cylinder 112 to support a magnetic compass (not shown).

The cylinder 112 is mounted for vertical movement within a sleeve 117 (Figs. 2 and 3), the upper end of which is rotatably mounted within a bushing 118 secured within the aligned openings in the gear housing 56 and plate 55. The lower end of the sleeve 117 is rotatably mounted within the bushing 18 and is also secured to an indicator arm 119 which rests upon the upper surface of plate 25. Cylinder 112 is secured against rotative movement within sleeve 117 by a pin 120 (Fig. 5) which extends through the cylinder 112 and engages a pair of slots 121 and 122 in the sleeve 117.

A journal block 123 (Fig. 2) and a split bearing block 124, which are secured to the indicator arm 119, rotatably support a horizontal shaft 125. A pinion 126 (Figs. 3 and 5) secured to one end of the shaft 125 extends through an opening 127 in the sleeve 117 (Fig. 3) to engage a rack 128 secured to the cylinder 112. A knob 129 (Figs. 2 and 7) secured to the other end of the shaft 125 cooperates with a calibrated dial 130 and serves to rotate the shaft 125 and the pinion 126 carried thereon to raise or lower the cylinder 112 within the sleeve 117. The pin 120 cooperating with the slots 121 and 122 (Fig. 2) limits the amount by which cylinder 112 can be raised or lowered. A thumbscrew 140 which extends through both halves of the split bearing block 124 is rotated to lock the shaft 125 and consequently the cylinder 112 in a predetermined adjusted vertical position.

Consequently, rotation of the shaft 125 raises and lowers the cylinder 112 so that the pick-up coil 110 may be positioned at the effective horizontal plane of the electromagnetic field produced by either one of the coils 96 or 97 (Fig. 9) within the inductor 70. The rotation of the indicator arm 119 rotates the sleeve 117 and consequently the cylinder 112 so that the pick-up coil 110 carried thereby may be rotated to the point of minimum electromagnetic field strength within the inner cavity of inductor 70.

The indicator arm 119 (Fig. 1) is calibrated in minutes of angular deflection at a scale portion 141 thereof. The scale portion 141 on arm 119 is calibrated from a mid-index mark 142 to thirty minutes (30') deflection both to the left and the right of the index mark 142 but may be calibrated in any other manner. Since the scale portion 141 is adjacent the scale portion 42 of the adjustable plate 29, the two scales cooperate to provide a vernier for indicating the position of the arm 119 with respect to the zero degree index mark 32 in degrees and minutes of angular deflection. The scale 141 also cooperates with the scale 43 on plate 37 to provide a vernier for indicating the position of the arm 119 with respect to the 90° index mark 50 in terms of degrees and minutes of angular deflection. A hole 143 (Figs. 1 and 2) in the indicating arm 119 is provided with an index mark 144 to cooperate with either of the index marks 27 and 28 so that index marks 27 and 28 can be aligned with the index mark 142 on the arm 119. A knurled knob 145 rigidly mounted on the indicating arm 119 acts as a means for rotating the indicating arm.

A bracket 146 (Fig. 2) which is secured to the indicating arm 119 supports a horizontally reciprocable scribe 147 having a hardened steel point. The scribe 147 is used to prick punch the outer surface of the inductor 70 to indicate various desired positions, such as the location of the magnetic axes of the coils 96 and 97. These prick punch marks are used to locate vertical lines which are later marked on the outer surface of the inductor 70. Since the scribe 147 may be moved from left to right as viewed in Fig. 2, it is possible to mark inductors 70 of various diameters.

Referring now to Fig. 9 of the drawings, the adjustable frequency output voltage from the oscillator 98 is applied to the coils 96 and 97 of the inductor 70 through a multiple position switch 148 and conductors 100. By varying the position of the switch 148, the voltage from oscillator 98 is applied to a particular one or more of the coils 96 or 97 to produce an electromagnetic field. For purposes of illustration, the minimum electromagnetic field strength axes of the coils 96 and 97 are designated X—X' and Y—Y', respectively. The oscillator 98 may be replaced by a battery 149 so that the coils 96 and 97 may be checked for proper polarity of connection.

All of the component parts of the indicating apparatus are made from materials which exhibit non-magnetic characteristics so that the apparatus will not impair the accuracy of the results obtained.

With the foregoing detailed description in mind, it is believed that the operation of the testing apparatus will now be understood.

For purposes of illustration, it is assumed that the inductor 70 to be tested is designed for the following performance characteristics: the X—X' magnetic axis of coil 96 (Fig. 9) should lie 15° in a clockwise direction from a predetermined inductor connecting pin 92; the X—X' magnetic axis should also be displaced 90° from the Y—Y' magnetic axis of coil 97.

In order to prepare the testing apparatus for operation, an attendant inserts a key into the hole 59 in the ring gear 58 and moves the ring gear 58 in a counterclockwise direction to rotate the planetary gears 60 so that the clutch pins 62 are moved outwardly away from the opening 68. The counterclockwise rotation of gear 58 also winds up spring 65 so that after the attendant places the inductor 70 in aligned testing position on plate 66 and removes the key from hole 59, the spring 65 moves the ring gear 58 in a clockwise direction to move clutch pins 62 into engagement with the outer surface of inductor 70 and to firmly grip this inductor in the central position (Figs. 2 and 3). The inductor 70 is placed on the plate 66 so that the desired locating pin 92 is aligned with the zero degree index mark on the scale 71 (Fig. 1).

The operator or attendant then moves the bifurcated tip 91 of the locating arm 88 into engagement with the particular connecting pin 92 which is to serve as the locating element for the X—X' magnetic axis. The bracket 80 and inductor 70 are rotated in a counterclockwise direction until the pointer 95 which cooperates with the scale 71 indicates that the pin 92 engaged by the tip 91 is displaced 15° clockwise from the zero degree index on the scale 71. In this position the X—X' axis of coil 96 theoretically should be aligned with the index mark 36 since the zero degree index mark on scale 71 and the index mark 36 are in alignment. Thumbscrew 83 is then tightened to clamp bracket 80 in this position.

The operator now connects the plurality of conductors 100 to the plurality of connecting pins 92 so that each pair of conductors 100 connected to each of the coils 96 and 97 forms a completed circuit to the oscillator 98 through switch 148. Next, the attendant moves the arms 25 and 119 relative to each other until the index marks 28, 32, 33, 36 and 144 are in perfect alignment.

Then, the operator manually moves switch 148 to apply alternating current voltage of the desired frequency to the coil 96. Knob 129 is then rotated to a predetermined position so that the electromagnetic pick-up coil 110 is at the proper elevation within the cylindrical cavity of the inductor 70 under test. The proper elevation of the coil 110 is determined by a visual inspection of scale 130. The coil 110 is secured in this adjusted position by turning thumbscrew 140 to clamp the shaft 125 within the split bearing block 124.

When the coil 110 is properly positioned within inductor 70, the indicating arm 119 is manually rotated until the voltmeter 113 shows a minimum field strength reading. At this time, the operator observes the adjacent scales 42 and 141 to determine the displacement of the magnetic axis X—X' from the zero index mark 36 in terms of degrees and minutes. If the displacement of the X—X' axis from index mark 36, and consequently from the locating pin 92, is greater than the allowable tolerance range, the inductor 70 is rejected. If the inductor 70 is acceptable, the scribe 147 is then moved to mark a reference point representing the X—X' axis on the outer surface of the inductor unit 70.

The displacement of the X—X' axis being acceptable, the operator loosens thumbscrews 31 and moves the scale plate 29 until the index mark 32 is in alignment with the indicating arm index mark 142. The scale plate 29 is secured in this position by tightening thumbscrews 31. This provides a permanent record of the displacement of the X—X' axis which the operator can refer to at the completion of the test.

Thumbscrew 26 is then loosened to allow quadrant plate 25 to be moved to realign index mark 28 with mark 144 and consequently with index mark 32. Thumbscrew 26 is tightened to secure quadrant plate 25 in this position. Thumbscrews 39 are then loosened and scale plate 37 is moved to realign index marks 50 and 27. Since marks 27 and 28 are displaced from each other by ninety degrees (90°), the realignment of marks 50 and 27 moves scale plate 37 into a position to indicate the displacement of the indicating arm 119 with respect to a point ninety degrees (90°) removed from the actual position of the X—X' axis of coil 96.

Switch 148 is then moved by the operator to apply voltage to coil 97 and to remove the energization from the coil 96. Next, the operator rotates indicating arm 119 until a minimum field strength indication is observed on the voltmeter 113 which indicates the Y—Y' axis of coil 97. By observing the relative positions of scales 43 and 141, the operator determines whether or not the displacement of the Y—Y' axis of coil 97 from the X—X' axis of coil 96 is within the acceptable tolerance range. The operator marks the position of the Y—Y' axis on the outer surface of the inductor 70 by moving the scribe 147 to produce a punch prick reference hole. If the position of the Y—Y' axis with respect to the X—X' axis is acceptable, the operator prepares the inductor 70 for a polarity test.

To prepare the testing apparatus for the polarity test, the operator opens switch 148 to remove the alternating current voltage from the coils 96 and 97 and replaces the oscillator 98 with the battery 149. A magnetic compass is then placed in the depression 101 (Figs. 3 and 10) and the movable base plate 23 is rotated until the needle of the compass forms a forty-five degree (45°) angle with each of the mutually perpendicular X—X' and Y—Y' index marks on the top of the cylinder 111 in Fig. 10. By positioning the needle of the compass midway between the X—X' and Y—Y' index marks, the influence of the earth's magnetic field is minimized and the needle is equally free to rotate toward either of these marks as an indication of the vectorial direction of the electromagnetic field produced by either of the coils 96 and 97. The battery 149 is then sequentially connected to each of the coils 96 and 97 and the direction and degree of deflection of the compass needle produced by the energization of each coil 96, 97 is observed by the operator as an indication of the direction of current flow through these coils and, consequently, of the vectorial direction of the electromagnetic field produced thereby. The battery 149 is then replaced by the oscillator 98 and alternating current voltage is applied to each of the coils 96 and 97 to remove any residual magnetism produced by the direct current voltage of battery 149.

The operator completes the test of the inductor 70 by manually removing the conductors 100 from the pins 92, moving the locating arm 88 out of engagement with the locating pin 92, and rotating the ring gear 58 in a counterclockwise direction so that the clutch pins 62 release the inductor 70 for removal from the plate 66.

It is to be understood that the above described embodiment is merely illustrative of the principles of this invention and that numerous other modifications may readily be devised by those skilled in the art which will fall within the spirit and scope of these principles.

What is claimed is:

1. An apparatus for determining and indicating the relative positions of magnetic axes produced by a multiple coil inductor, which apparatus comprises means for sequentially energizing each of the coils of the inductor to produce a series of different electromagnetic fields, means for indicating the angular position of the minimum electromagnetic field strength of each coil, and means for measuring the angular separation between the successive minimum field strength indications.

2. An apparatus for determining and indicating the position of the magnetic axis of an electromagnetic field of an inductor unit with respect to a connecting pin of the inductor unit, comprising a scale, means for securing the connecting pin in a predetermined position with relation to the scale, means for energizing the inductor unit to produce an electromagnetic field having a magnetic axis, a rotatable pick-up coil mounted in the electromagnetic field, and a scribe cooperating with said scale to mark the surface of the inductor unit at said magnetic axis.

3. An apparatus for determining the position of the magnetic axis of an electromagnetic field produced by an inductor with respect to a connecting pin of the inductor, comprising inductor supporting means, connecting pin locating means for securing the inductor in a predetermined position on the supporting means, means for energizing the inductor to produce an electromagnetic field, a rotatable pick-up coil positioned within said field, means for moving said coil to the position of minimum electromagnetic field strength, and a scribe for marking on the surface of the inductor to indicate the angular displacement between the position of the connecting pin and the position of the pick-up coil at the point of minimum field strength.

4. An apparatus for determining and indicating the angular separation between magnetic axes of a multiple coil inductor comprising a base, inductor holding means secured to the base, electromagnetic detecting means rotatably mounted on the base and extending into electromagnetic fields produced by the inductor, and calibrated means secured to the detecting means for indicating the amount of movement of the detecting means to provide an indication of the positions of the magnetic axes of the electromagnetic fields produced by the inductor.

5. An apparatus for indicating the angular separation between magnetic axes of a multiple coil inductor comprising a base, inductor holding means secured to and spaced above the base, electromagnetic detecting means rotatably mounted on the base and extending into electromagnetic fields produced by the inductor, a first calibrated means secured to the base, and a second calibrated means secured to the detecting means and movable adjacent the first calibrated means so as to indicate the movement of the detecting means relative to the base.

6. An apparatus for indicating the angular separation between magnetic axes of a multiple coil inductor comprising a base, inductor holding means secured to and spaced above the base, electromagnetic detecting means rotatably mounted on the base and extending into electromagnetic fields produced by the inductor, means for adjusting the vertical position of the detecting means relative to the electromagnetic fields, a first calibrated means secured to the base, and a second calibrated means secured to the detecting means and movable adjacent the first calibrated means to produce an indication of the relative movement between the detecting means and the base.

7. An apparatus for indicating the relative positions of a plurality of magnetic axes produced by a multiple coil inductor, which apparatus comprises a base, an inductor holding means secured to the base, an adjustable inductor positioning means mounted on the holding means, electromagnetic detecting means rotatably mounted on the base and extending into electromagnetic fields produced by the inductor, a first calibrated means secured to the base, and a second calibrated means secured to the detecting means and movable adjacent the first calibrated means to produce an indication of movement of the detecting means relative to the base.

8. An apparatus for indicating the relative positions of magnetic axes produced by a multiple coil inductor, which apparatus comprises a base, a resilient inductor holding means secured to the base, adjustable inductor positioning means mounted on the holding means, means for sequentially energizing each of the coils in the inductor to produce a series of electromagnetic fields, electromagnetic detecting means extending into the electromagnetic fields and rotatably mounted on the base, means for varying the vertical position of the detecting means with respect to the fields, a plurality of scales secured to the base, and a calibrated means secured to the detecting means and movable adjacent the plurality of scales for indicating the movement of the detecting means relative to the electromagnetic fields.

9. An apparatus for determining and indicating the relative positions of a plurality of magnetic axes of a plurality of electromagnetic fields produced by a multiple coil inductor, which apparatus comprises a base, an apertured inductor supporting plate secured to and spaced above the base, a sleeve rotatably mounted in the base, a cylinder slidably mounted in the sleeve and extending upwardly through the aperture in the plate, an electromagnetic detecting means secured to the cylinder, means for raising and lowering the cylinder within the sleeve to vary the vertical position of the detecting means, a calibrated indicating arm secured to the sleeve, and a scale secured to the base and cooperating with the calibrated arm to provide an indication of the amount of angular movement of the arm and detecting means secured thereto.

10. An apparatus for determining and indicating the relative positions of a plurality of magnetic axes produced by a multiple coil inductor, which apparatus comprises a base, an apertured inductor supporting plate secured to and spaced above the base, a sleeve rotatably mounted in the base, a cylinder slidably mounted in the sleeve and extending upwardly through the aperture in the plate, electromagnetic detecting means secured to the cylinder, means for raising and lowering the cylinder within the sleeve to vary the vertical positions of the detecting means, means for locking the cylinder in a desired vertical position, a calibrated indicating arm secured to the sleeve and resting on the base, a plurality of scales movably mounted on the base, and means for locking the scales in a desired position on the base to cooperate with the calibrated arm for indicating the angular movement of the arm and detecting means.

11. An apparatus for determining and indicating the position of a connecting pin and a magnetic axis of an inductor unit comprising means for energizing the inductor unit to produce an electromagnetic field, detecting means rotatably mounted within the field to determine the magnetic axis of said field, means cooperating with said detecting means to indicate the angular displacement of the inductor connecting pin with respect to said magnetic axis, and means cooperating with said detecting means to mark the surface of the inductor unit at said magnetic axis.

12. An apparatus for determining and indicating the relative positions of a plurality of magnetic axes produced by a multiple coil inductor, which apparatus comprises a base, an apertured inductor supporting plate secured to and spaced above the base, an inductor holding means cooperating with the inductor supporting plate, a sleeve rotatably mounted in the base, a cylinder slidably mounted within the sleeve and rotatable therewith and extending upwardly through said aperture in the plate, electromagnetic detecting means secured to the cylinder, means for moving the cylinder to adjust the vertical position of the detecting means, a scale attached to said adjusting means to indicate the vertical position of the detecting means, means for locking the cylinder and the detecting means in a desired vertical position, a calibrated indicating arm secured to the sleeve and resting on the base, a plurality of scales movably mounted on the base, means for locking the scales in a desired position on the base to cooperate with the calibrated arm for indicating the angular movement of the arm and detecting means, and a scribe mounted on said indicating arm and rotatable therewith for marking the positions of the magnetic axes as determined.

HARRY DUKE.
WALTER BAKER GREENWOOD.
JEAN THOMAS.

References Cited in the file of this patent

UNITED STATES PATENTS

| Number | Name | Date |
| --- | --- | --- |
| 1,344,388 | Eisenmann | June 22, 1920 |
| 1,526,391 | Stewart | Feb. 17, 1925 |
| 2,167,490 | Ryan | July 25, 1939 |
| 2,490,102 | Stein | Dec. 6, 1949 |
| 2,500,680 | Herrick et al. | Mar. 14, 1950 |
| 2,531,807 | Pangher | Nov. 28, 1950 |

OTHER REFERENCES

Instruments, May 1949, volume 22, pages 432, 434, 436.